United States Patent
Ko et al.

(10) Patent No.: US 12,555,922 B2
(45) Date of Patent: Feb. 17, 2026

(54) METHOD FOR CONTROLLING BEAM USING LENS IN WIRELESS COMMUNICATION SYSTEM

(71) Applicants: Samsung Electronics Co., Ltd., Suwon-si (KR); POSTECH RESEARCH AND BUSINESS DEVELOPMENT FOUNDATION, Pohang-si (KR)

(72) Inventors: Seungtae Ko, Suwon-si (KR); Wonbin Hong, Suwon-si (KR); Youngju Lee, Suwon-si (KR); Youngno Youn, Pohang-si (KR); Jaehong Choi, Pohang-si (KR)

(73) Assignees: Samsung Electronics Co., Ltd., Suwon-si (KR); POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 138 days.

(21) Appl. No.: 18/335,517

(22) Filed: Jun. 15, 2023

(65) Prior Publication Data

US 2023/0327343 A1     Oct. 12, 2023

Related U.S. Application Data

(63) Continuation of application No. PCT/KR2021/018544, filed on Dec. 8, 2021.

(30) Foreign Application Priority Data

Dec. 15, 2020 (KR) .......................... 10-2020-0175767

(51) Int. Cl.
*H01Q 19/06* (2006.01)
*H01Q 3/36* (2006.01)

(52) U.S. Cl.
CPC ............... *H01Q 19/06* (2013.01); *H01Q 3/36* (2013.01)

(58) Field of Classification Search
CPC ............ H01Q 19/06; H01Q 3/36; H01Q 3/30; H01Q 1/246; H01Q 15/08; H01Q 25/008;
(Continued)

(56) References Cited

U.S. PATENT DOCUMENTS

| 8,130,171 B2 | 3/2012 | Lam et al. |
|---|---|---|
| 8,659,502 B2 | 2/2014 | Lam et al. |

(Continued)

FOREIGN PATENT DOCUMENTS

| CN | 107369915 A | 11/2017 |
|---|---|---|
| EP | 3 706 243 A1 | 9/2020 |

(Continued)

OTHER PUBLICATIONS

Michael Marcus et al., Millimeter Wave Propagation: Spectrum Management Implications, IEEE Microwave Magazine, Jun. 2005.

(Continued)

*Primary Examiner* — Awat M Salih
(74) *Attorney, Agent, or Firm* — Jefferson IP Law, LLP

(57) ABSTRACT

A beamforming device in a wireless communication system is provided that includes a phased array antenna, at least one wireless communication circuit, and a lens, wherein the lens comprises a first surface oriented in a first direction, which is the direction toward the phased array antenna, and a second surface oriented in a second direction, which is the opposite direction of the first direction, and a first beam radiated from the phased array antenna is refracted after passing through a first point on the first surface, and forms a first path inside the lens and forms a second path along which the first beam is refracted at a second point on the second surface after passing through the inside of the lens (Continued)

along the first path, wherein the refraction angle at the second point may be formed so as to be dependent on the radiation angle of the first beam.

20 Claims, 13 Drawing Sheets

(58) Field of Classification Search
CPC .. H04B 7/0617; H04B 7/0695; H04B 7/0697; H04B 7/0682; G02B 3/00; G02B 3/0087; G02B 2003/0093
See application file for complete search history.

(56) References Cited

U.S. PATENT DOCUMENTS

| | | | |
|---|---|---|---|
| 9,515,388 | B2 | 12/2016 | Chernokalov et al. |
| 10,256,551 | B2 | 4/2019 | Shehan |
| 10,770,790 | B1 | 9/2020 | Mahanfar |
| 10,950,937 | B2 | 3/2021 | Ko et al. |
| 11,233,334 | B2 | 1/2022 | Ko et al. |
| 11,289,818 | B2 | 3/2022 | Deng et al. |
| 11,527,836 | B2* | 12/2022 | Kim ............ H01Q 3/30 |
| 2010/0277398 | A1 | 11/2010 | Lam et al. |
| 2012/0146882 | A1 | 6/2012 | Binzer et al. |
| 2012/0306708 | A1* | 12/2012 | Henderson ......... H01Q 15/08 343/753 |
| 2017/0324171 | A1 | 11/2017 | Shehan |
| 2019/0148836 | A1 | 5/2019 | Hu et al. |
| 2019/0317210 | A1 | 10/2019 | Fillion |
| 2020/0350692 | A1 | 11/2020 | Ko et al. |
| 2023/0275358 | A1* | 8/2023 | Geng ............ H01Q 15/04 343/702 |

FOREIGN PATENT DOCUMENTS

| | | |
|---|---|---|
| KR | 10-2018-0096362 A | 8/2018 |
| KR | 10-2019-0118792 A | 10/2019 |
| KR | 10-2020-0029756 A | 3/2020 |
| WO | 2011/000607 A1 | 1/2011 |
| WO | 2019/129298 A1 | 7/2019 |

OTHER PUBLICATIONS

Jae-Hyun Lee et al., Cell Coverage Analysis of 28 GHz Millimeter Wave in Urban Microcell Environment Using 3-D Ray Tracing, IEEE Transactions on Antennas and Propagation, vol. 66, No. 3, Mar. 2018.

Nurul H. Noordin et al., Antenna Array with Wide Angle Scanning Properties, 6th European Conference on Antennas and Propagation (EUCAP), IEEE, 2011.

Min Liang et al., A 3-D Luneburg Lens Antenna Fabricated by Polymer Jetting Rapid Prototyping, IEEE Transactions on Antennas and Propagation, vol. 62, No. 4, Apr. 2014.

Ngoc Tinh Nguyen et al., Size and Weight Reduction of Integrated Lens Antennas Using a Cylindrical Air Cavity, IEEE Transactions on Antennas and Propagation, vol. 60, No. 12, Dec. 2012.

A. Skalare et al., A Planar Dipole Array Antenna with an Elliptical Lens, Microwave and Optical Technology Letters, vol. 4, No. 1, Jan. 5, 1991.

Huan Yi et al., 3-D Printed Millimeter-Wave and Terahertz Lenses with Fixed and Frequency Scanned Beam, IEEE Transactions on Antennas and Propagation, vol. 64, No. 2, Feb. 2016.

Alexey Artemenko et al., Experimental Characterization of E-Band Two-Dimensional Electronically Beam-Steerable Integrated Lens Antennas, IEEE Antennas and Wireless Propagation Letters, vol. 12, 2013.

Jan Hesselbarth et al., Millimeter-Wave Front-End Integration Concept Using Beam-Switched Lens Antenna, 2016 10th European Conference on Antennas and Propagation (EuCAP). IEEE, 2016.

Zhishu Qu et al., Wide-Angle Scanning Lens Fed by Small-Scale Antenna Array for 5G in Millimeter-Wave Band, IEEE Transactions on Antennas and Propagation, vol. 68, No. 5, May 2020.

Carlos A. Fernandes et al., Dielectric Lens Antennas, Sep. 2016.

International Search Report dated Mar. 29, 2022, issued in International Application No. PCT/KR2021/018544.

Extended European Search Report dated Mar. 22, 2024, issued in European Patent Application No. 21906968.9.

Korean Office Action dated Dec. 3, 2024, issued in Korean Patent Application No. 10-2020-0175767.

* cited by examiner

+

=

METHOD FOR CONTROLLING BEAM USING LENS IN WIRELESS COMMUNICATION SYSTEM

CROSS-REFERENCE TO RELATED APPLICATION(S)

This application is a continuation application, claiming priority under § 365(c), of an International application No. PCT/KR2021/018544, filed on Dec. 8, 2021, which is based on and claims the benefit of a Korean patent application number 10-2020-0175767, filed on Dec. 15, 2020, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Postech Research and Business Development Foundation.

BACKGROUND

1. Field

The disclosure relates to a wireless communication system. More particularly, the disclosure relates to a device for controlling a beam by using a lens in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (millimeter wave (mmWave)) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

When the mmWave frequency band is used in the 5G system, free space path loss increases and diffraction decreases. Therefore, various technologies may be used together to solve this problem. For example, a phased array antenna is a technology capable of real-time beam steering through electrical control and enhancing the gain of a beam. As another example, an integrated lens antenna (ILA) is a technology capable of wide-angle steering in a phased array antenna by placing a lens on a radiation path of the antenna. At this time, a more effective use of the lens is required in consideration of a space for installing the lens, improvement of beam gain by the lens, and a beam steering angle by the lens.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device for controlling a wide angle while satisfying a beamforming gain by using a lens in a wireless communication system.

Another aspect of the disclosure is to provide structures of inner and outer surfaces of a lens for controlling a wide angle in a wireless communication system.

Another aspect of the disclosure is to provide a device for controlling a wide angle in various frequency bands by using a lens in a wireless communication system.

Another aspect of the disclosure is to provide a device for controlling a wide angle for an arbitrary antenna by using a lens in a wireless communication system.

Additional aspects will be set forth in part in the description which follows and, in part, will be apparent from the description, or may be learned by practice of the presented embodiments.

In accordance with an aspect of the disclosure, a beamforming device in a wireless communication system is provided. The beamforming device includes a phased array antenna, at least one wireless communication circuit, and a lens, wherein the lens includes a first surface facing a first direction, which is a direction toward the phased array antenna, and a second surface facing a second direction opposite to the first direction, a first beam radiated from the phased array antenna is refracted past a first point on the first surface, the first beam forms a first path in the lens and a second path along which the first beam passing through an inside of the lens along the first path and passing through a second point on the second surface is refracted, and a refraction angle at the second point is formed to depend on a radiation angle of the first beam.

A device according to various embodiments of the disclosure may increase a maximum steering range of a beam radiated through a lens having a specific structure while maintaining a gain of the beam.

A device according to various embodiments of the disclosure may be applied regardless of the frequency band of a beam radiated through a lens having a specific structure and the type of antenna, thereby making it possible to design an efficient radio frequency (RF) device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the disclosure described below describe hardware-based approaches as examples. However, various embodiments of the disclosure include techniques that utilize both hardware and software, and the various embodiments of the disclosure are not intended to exclude software-based approaches.

Hereinafter, the disclosure relates to a device and a method for performing beamforming through a lens in a wireless communication system. Specifically, the disclosure describes a technology for increasing a beamforming gain by widening an area in which a beam formed by an antenna array is projected onto a lens in a wireless communication system.

As used in the following description, terms referring to signals (symbols, streams, data, beamforming signals), terms relating to beams (multi-beam, multiple beams, single beam, dual beam, quad-beam, beamforming), terms referring to network entities, and terms referring to components of the apparatus (antenna array, antenna element, communication unit, antenna) are exemplified for ease of description. Accordingly, the disclosure is not limited to the terms described herein, and other terms having equivalent technical meaning may be used.

In addition, the disclosure describes various embodiments using terminology used in some telecommunications standards (e.g., 3rd Generation Partnership Project (3GPP)), but this is for illustrative purposes only. The various embodiments of the disclosure can be readily adapted and applied to other communication systems.

Figure 1:
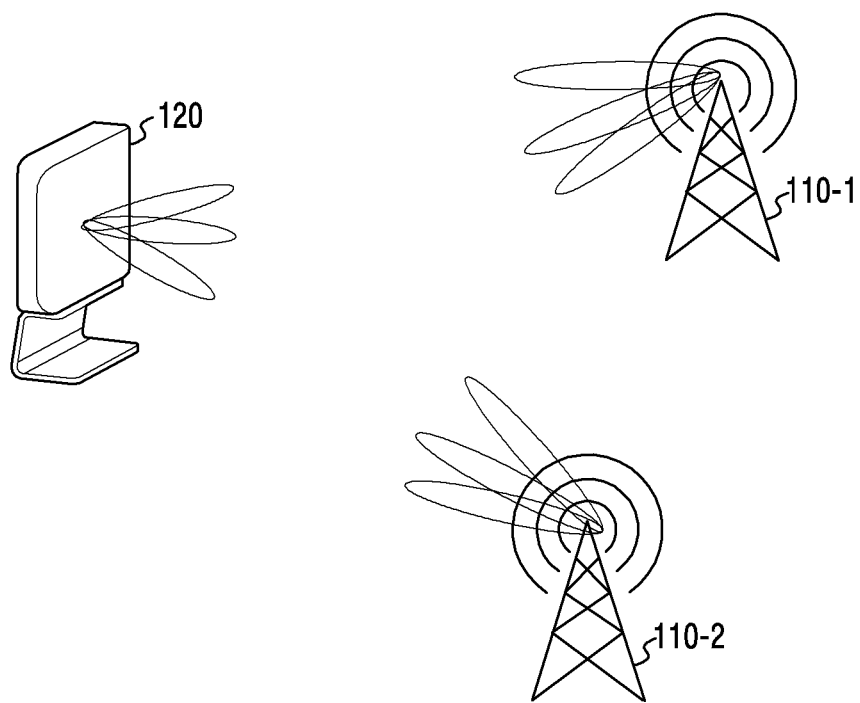
FIG. 1 illustrates a wireless communication system according to an embodiment of the disclosure.

FIG. 1 illustrates a wireless communication system according to an embodiment of the disclosure.

FIG. 1 illustrates a base station 110-1, a base station 110-2, and a terminal 120 as some of nodes using a radio channel in a wireless communication system. Although FIG. 1 shows two base stations, other base stations identical or similar to the base station 110-1 and the base station 110-2 may be further included. In addition, although FIG. 1 shows only one terminal, other terminals identical to or similar to the terminal 120 may be further included.

The base station 110-1 and the base station 110-2 are network infrastructures that provide wireless access to the terminal 120. The base station 110-1 and the base station 110-2 have coverage defined as a predetermined geographical area based on a distance over which signals can be transmitted. Each of the base station 110-1 and the base station 110-2 may be referred to as an "access point (AP)", "eNodeB (eNB)", "5th generation node (5G node)", "wireless point", "transmission/reception point (TRP)", or other terms having equivalent technical meaning, in addition to a base station.

The terminal 120 is a device used by a user, and communicates with the base station 110-1 and the base station 110-2 through a wireless channel. The terminal 120 may have mobility or may be a fixed device. In some cases, the terminal 120 may be operated without user intervention. For example, the terminal 120 is a device for performing machine-type communication (MTC), and may not be carried by a user. The terminal 120 may be referred to as "user equipment (UE)", "mobile station", "subscriber station", "remote terminal", "wireless terminal", "electronic device (user device)", "customer premise equipment (CPE)", or other terms having equivalent technical meaning, in addition to a terminal.

The base station 110-1, the base station 110-2, and the terminal 120 may transmit and receive wireless signals in a mmWave band (e.g., 28 GHz, 30 GHz, 38 GHz, or 60 GHz). At this time, in order to improve a channel gain, the base station 110-1, the base station 110-2, and the terminal 120 may perform beamforming. Here, beamforming may include transmission beamforming and reception beamforming. That is, the base station 110-1, the base station 110-2, and the terminal 120 may assign directivity to a transmission signal or a reception signal. To this end, the base station 110-1, the base station 110-2, and the terminal 120 may select serving beams 112, 113, 121, and 131 through a beam search or beam management procedure. After the serving beams 112, 113, 121, and 131 are selected, communication may be performed through a resource having a quasi co-located (QCL) relationship with a resource through which the serving beams 112, 113, 121, and 131 have been transmitted.

When large-scale characteristics of a channel through which a symbol on a first antenna port has been transmitted may be inferred from a channel through which a symbol on a second antenna port has been transmitted, the first antenna port and the second antenna port may be evaluated as having a QCL relationship. For example, the large-scale characteristics may include at least one among delay spread, Doppler spread, Doppler shift, average gain, average delay, and spatial receiver parameter.

Figure 2:
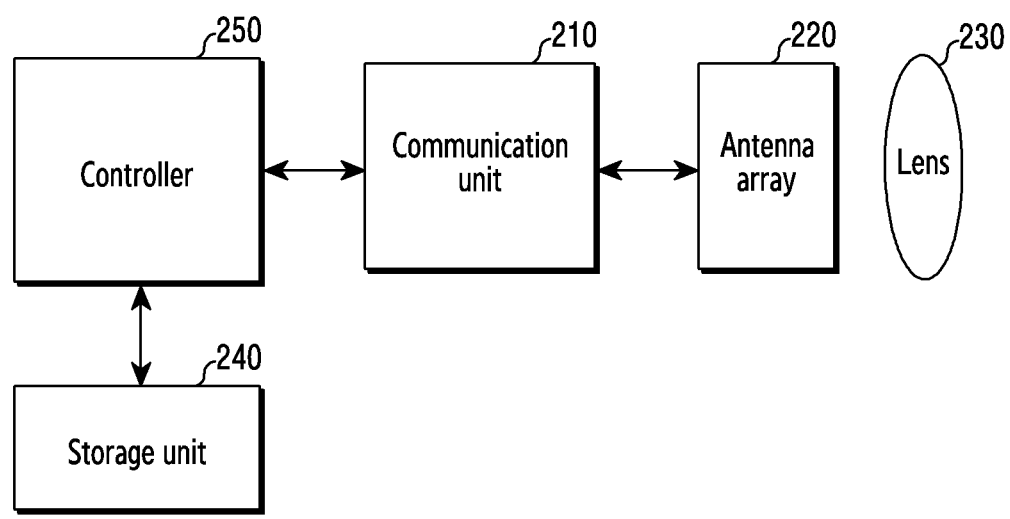
FIG. 2 illustrates a configuration of a beamforming device in a wireless communication system according to an embodiment of the disclosure.

FIG. 2 illustrates a configuration of a beamforming device in a wireless communication system according to an embodiment of the disclosure. The configuration illustrated in FIG. 2 may be understood as a configuration of the terminal 120. The terms " . . . unit", " . . . device", etc. used below may refer to a unit for processing at least one function or operation, and may be implemented as hardware, software, or a combination of hardware and software.

Referring to FIG. 2, a beamforming device includes an antenna array 220, a communication unit 210, a lens 230, a storage unit 240, and a controller 250.

The communication unit 210 performs functions for transmitting and receiving signals through a wireless channel. For example, the communication unit 210 performs a conversion function between a baseband signal and a bit stream according to the physical layer standard of a system. For example, when transmitting data, the communication unit 210 generates complex symbols by encoding and modulating a transmission bit stream. In addition, when receiving data, the communication unit 210 reconstructs a received bit stream by demodulating and decoding a baseband signal. In addition, the communication unit 210 up-converts a baseband signal into an RF-band signal and transmits the RF-band signal through an antenna, and down-converts an RF-band signal received through the antenna into a baseband signal. For example, the communication unit 210 may include a transmission filter, a reception filter, an amplifier, a mixer, an oscillator, a digital-to-analog converter (DAC), an analog-to-digital converter (ADC), and the like.

Also, the communication unit 210 may include multiple transmission and reception paths. In terms of hardware, the communication unit 210 may be configured as a digital circuit and an analog circuit (e.g., a radio frequency integrated circuit (RFIC)). Here, the digital circuit and the analog circuit may be implemented in one package. Also, the communication unit 210 may include multiple RF chains. Furthermore, the communication unit 210 may perform beamforming.

The communication unit 210 transmits and receives signals as described above. Accordingly, all or part of the communication unit 210 may be referred to as a "transmitter", "receiver", or "transmitter". Also, in the following description, transmission and reception performed through a radio channel are used to imply that the above-described processing is performed by the communication unit 210.

The antenna array 220 radiates a signal generated by the communication unit 210 or receives a signal transmitted from the outside. The antenna array 220 may include multiple antenna elements. Signal directionality may be given by phase values of signals transmitted through the multiple antenna elements. That is, the antenna array 220 may perform beamforming through phase values. According to various embodiments, signals transmitted from the antenna array 220 may be radiated through multiple beams corresponding to multiple directions.

The lens 230 is a constituent element for adjusting the gain of a signal radiated from the antenna array 220 or a signal transmitted from the outside. For example, the lens 230 may be a passive element which adjusts the gain of a signal passing therethrough. Also, for example, the lens 230 may be an active element for adaptively adjusting a gain according to a signal.

The lens 230 may include multiple unit cells (UCs). Specifically, the lens 230 may include multiple unit cells, and each of the multiple unit cells may have unique permittivity or a unique shape. Here, the permittivity of each unit cell may be determined based on the type of material (e.g., a dielectric) constituting the unit cell and the shape and size of a material (e.g., a conductor) included in the unit cell. Depending on the permittivity of the unit cell, a value for compensating for a phase of a component (e.g., a propagation component) of a beam incident on the unit cell may vary. In terms of an equivalent circuit, each unit cell may be interpreted as a circuit including at least one capacitor or at least one inductor. According to various embodiments, the lens 230 may include multiple layers. Also, the lens 230 may have various shapes. For example, the lens 230 may have the shape of a flat structure, that is, a plane, may have the shape of a circular plane, or may have the shape of a divided circular plane. In another example, the lens 230 may have a quadrangular shape or an octagonal shape.

The storage unit 240 stores data such as a basic program for operation of the beamforming device, an application program, and configuration information. The storage unit 240 may include volatile memory, non-volatile memory, or a combination of volatile memory and non-volatile memory. The storage unit 240 provides the stored data in response to a request from the controller 250. According to various embodiments, the storage unit 240 may store a phase profile (e.g., a phase pattern) for controlling a beam by using a lens.

The controller 250 controls overall operations of the beamforming device. For example, the controller 250 transmits and receives signals through the communication unit 210. Also, the controller 250 writes data to and reads data from the storage unit 240. The controller 250 may perform protocol stack functions required by communication standards. To this end, the controller 250 may include at least one processor or microprocessor, or may be a part of the processor. Also, a part of the communication unit 210 and the controller 250 may be referred to as a communication processor (CP). According to various embodiments, the controller 250 may control the communication unit 210 to perform beamforming by applying a phase pattern for forming multiple beams (hereinafter, multi-beam) (hereinafter, multi-beamforming). Here, the multi-beam refers to multiple beams, the shapes of which point in multiple directions, rather than a single beam in which the shape of a beam formed during beamforming points in a single direction. For example, the controller 250 may control the beamforming device to perform operations according to various embodiments described below.

Figure 3A:
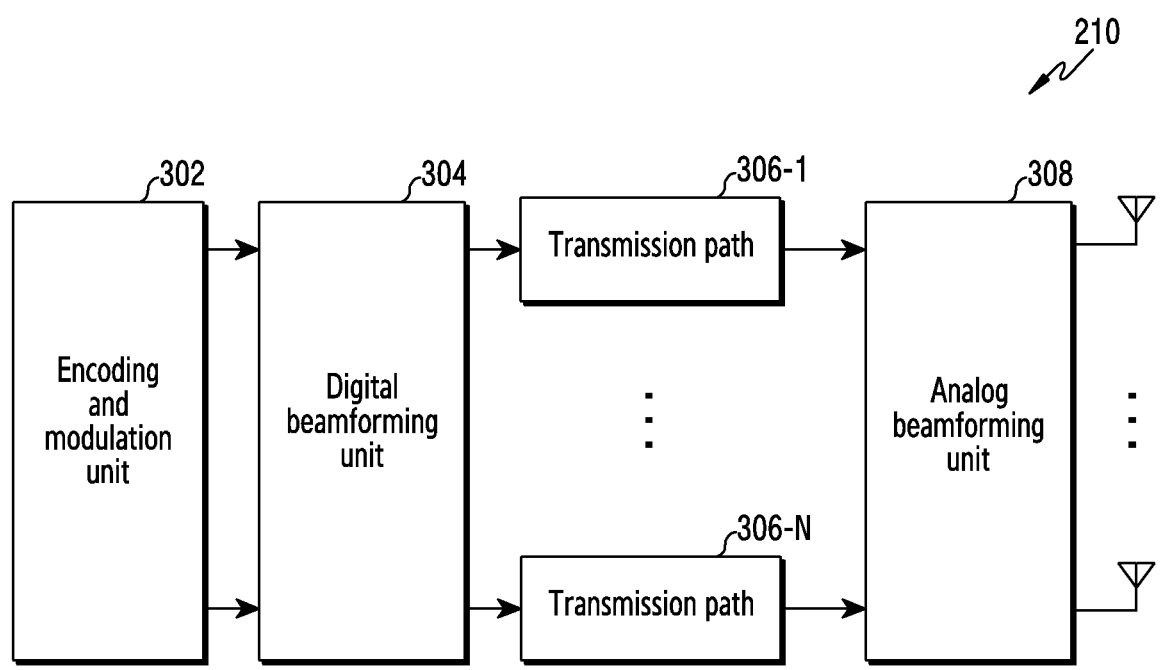
FIGS. 3A, 3B, and 3C illustrate the configuration of a communication unit in a wireless communication system according to various embodiments of the disclosure.
Figure 3B:
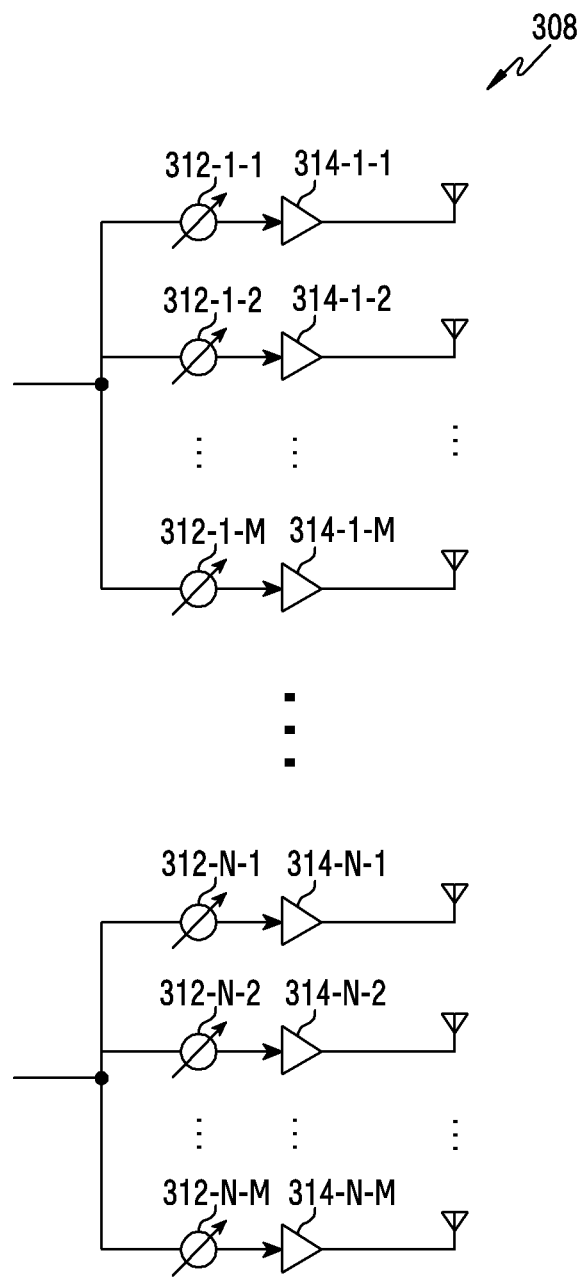
Figure 3C:
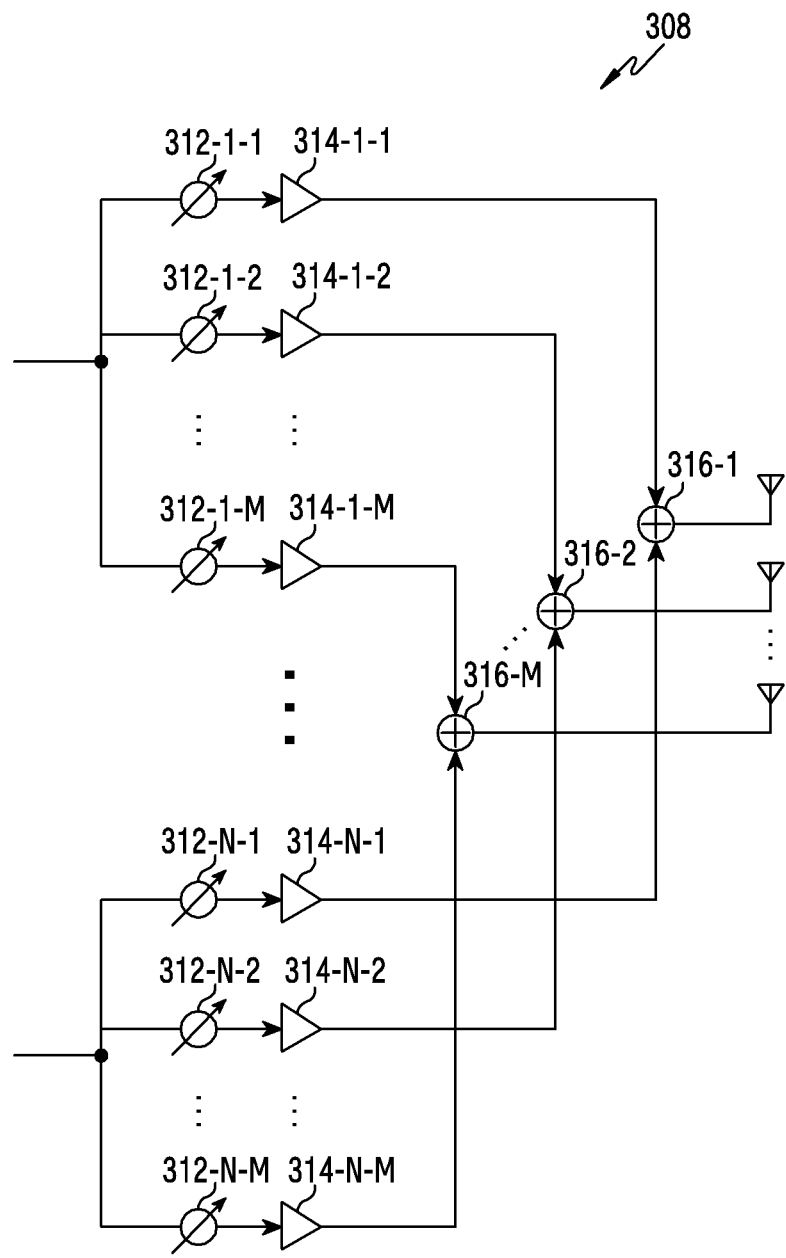

FIGS. 3A, 3B, and 3C illustrate the configuration of a communication unit in a wireless communication system according to various embodiments of the disclosure. FIGS. 3A to 3C illustrate an example of a detailed configuration of the communication unit 210 in FIG. 2. Specifically, FIGS. 3A to 3C illustrate constituent elements for performing beamforming, as part of the communication unit 210 in FIG. 2.

Referring to FIG. 3A, the communication unit 210 includes an encoding and modulation unit 302, a digital beamforming unit 304, multiple transmission paths 306-1 to 306-N, and an analog beamforming unit 308.

The encoding and modulation unit 302 performs channel encoding. For channel encoding, at least one among a low-density parity check (LDPC) code, a convolution code, and a polar code may be used. The encoding and modulation unit 302 generates modulation symbols by performing constellation mapping.

The digital beamforming unit 304 performs beamforming on digital signals (e.g., modulation symbols). To this end, the digital beamforming unit 304 multiplies modulation symbols by beamforming weights. Here, beamforming weights are used to change the magnitude and phase of a signal, and may be referred to as a "precoding matrix", a "precoder", and the like. The digital beamforming unit 304 outputs digitally beamformed modulation symbols to the multiple transmission paths 306-1 to 306-N. In this case, according to a multiple input multiple output (MIMO) transmission technique, the modulation symbols may be multiplexed, or identical modulation symbols may be provided to the multiple transmission paths 306-1 to 306-N.

The multiple transmission paths 306-1 to 306-N convert digital signals, which have been digitally beamformed, into analog signals. To this end, each of the multiple transmission paths 306-1 to 306-N may include an inverse fast Fourier transform (IFFT) operation unit, a cyclic prefix (CP) insertion unit, a DAC, and an up-conversion unit. The CP insertion unit is for orthogonal frequency division multiplexing (OFDM), and may be excluded when another physical layer method (e.g., filter bank multi-carrier (FBMC)) is applied. That is, the multiple transmission paths 306-1 to 306-N provide independent signal processing processes for multiple streams generated through digital beamforming. However, depending on the implementation method, some of the constituent elements of the multiple transmission paths 306-1 to 306-N may be used in common.

The analog beamforming unit 308 performs beamforming on an analog signal. To this end, the digital beamforming unit 304 multiplies analog signals by beamforming weights. Here, the beamforming weights are used to change the magnitude and phase of a signal. Specifically, according to the multiple transmission paths 306-1 to 306-N and a connection structure between antennas, the analog beamforming unit 308 may be configured as shown in FIG. 3B or 3C.

Referring to FIG. 3B, signals input into the analog beamforming unit 308 are transmitted through antennas after undergoing phase/magnitude conversion and amplification operations. At this time, the signals of the respective path are transmitted through different antenna sets, that is, antenna arrays. When examining processing of signals input through a first path, the signals are converted into signal sequences having different or identical phases/magnitudes by phase/magnitude converters 312-1-1 to 312-1-M, are amplified by amplifiers 314-1-1 to 314-1-M, and 312-N-1 to 312-N-M are amplified by amplifiers 314-N-1 to 314-N-M and are then transmitted through the antennas.

Referring to FIG. 3C, signals input into the analog beamforming unit 308 are transmitted through antennas after undergoing phase/magnitude conversion and amplification operations. At this time, the signals of the respective paths are transmitted through an identical antenna set, that is, an antenna array. Looking at processing of signals input through the first path, the signals are converted into signal sequences having different or identical phases/magnitudes by the phase/magnitude converters 312-1-1 to 312-1-M, and are amplified by the amplifiers 314-1-1 to 314-1-M. The amplified signals are summed by summing units 316-1-1 to 316-1-M based on antenna elements so as to be transmitted through one antenna array, and are then transmitted through the antennas.

The phase/magnitude values converted by the phase/magnitude converters 312-1-1 to 312-1-M shown in FIGS. 3B and 3C may include phase/magnitude values for adjusting beam directionality and phase/magnitude values for forming multiple beams (i.e., multi-beam). The phase/magnitude values for forming multiple beams refer to phase/magnitude values for beamforming that provide spatially differentiated directions by generating a shadow area, in which a phase is offset, in the shape of the beams to be formed. At this time, the number of beams formed may be adjusted to control a gain, and for example, may be adjusted based on a channel or may be adjusted to increase a gain enhancement effect by a lens. According to an embodiment, in order to increase the gain enhancement effect by the lens, the phase/magnitude values for forming the multi-beam are a reference phase/magnitude values of the phase/magnitude converters 312-1-1 to 312-1-M, in other words, as default configuration values of the phase/magnitude converters 312-1-1 to 312-1-M.

FIG. 3B shows an example in which an independent antenna array is used for each transmission path, and FIG. 3C shows an example in which transmission paths share one antenna array. However, according to another embodiment, some transmission paths may use independent antenna arrays, and the other transmission paths may share one antenna array. Furthermore, according to another embodiment, a structure capable of being adaptively changed depending on circumstances may be used by applying a switchable structure between transmission paths and antenna arrays.

According to the configuration of the beamforming device (e.g., the terminal 120) described with reference to FIGS. 2 and 3A to 3C, the beamforming device may use a lens to improve the gain of a signal radiated from an antenna array or a signal received through the antenna array. Similarly, a base station (e.g., the base station 110-1 or the base station 110-2) may also include at least one lens. Furthermore, according to various embodiments, the base station may include a lens having a structure described later. Accordingly, hereinafter, embodiments related to the lens are described with respect to a terminal for convenience of description, but various embodiments described later may be applied to any device, which performs beamforming, as well as a base station.

Using a lens (e.g., the lens 230) may increase a signal gain. The lens may increase the gain of an antenna by changing a phase profile of an electronic magnetic (EM) wave in space into the same phase. Hereinafter, the principle of increasing the signal gain by the lens will be described with reference to FIGS. 4A to 4C.

Figure 4A:
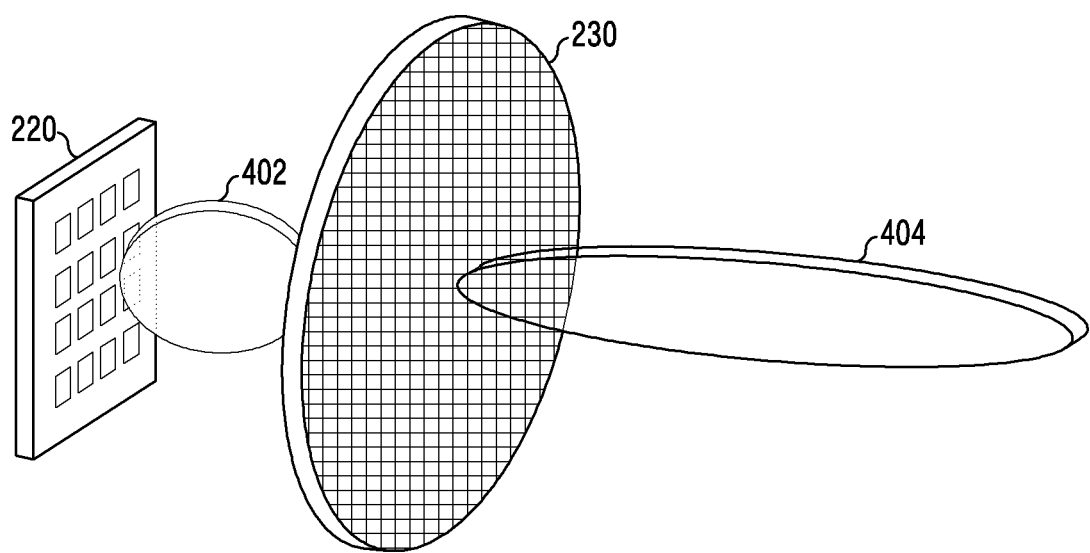
FIGS. 4A, 4B, and 4C illustrate the improvement of signal gain through a lens in a wireless communication system according to various embodiments of the disclosure.
Figure 4B:
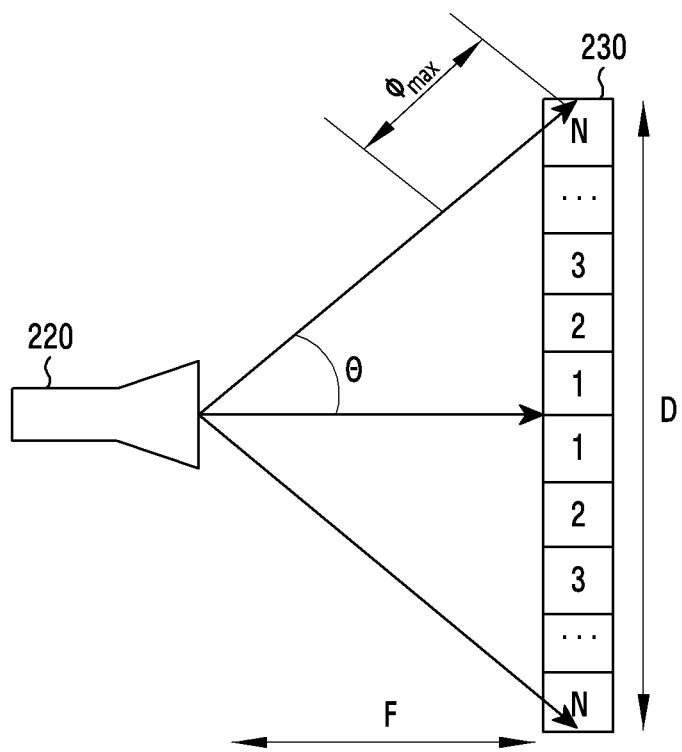
Figure 4C:
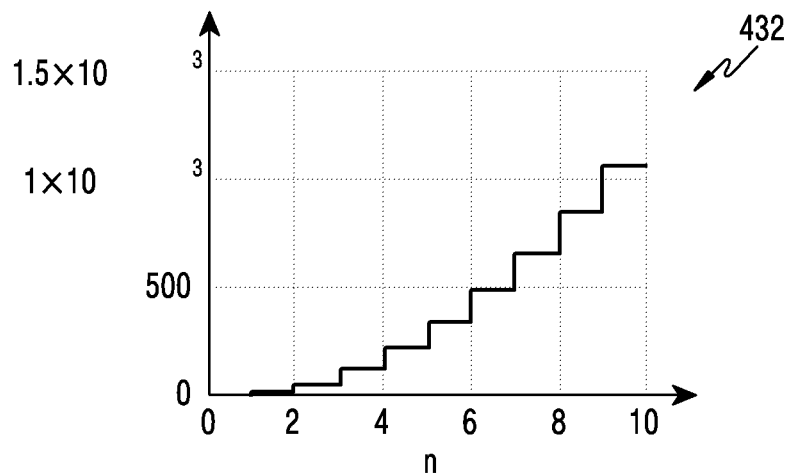
Figure 4C:
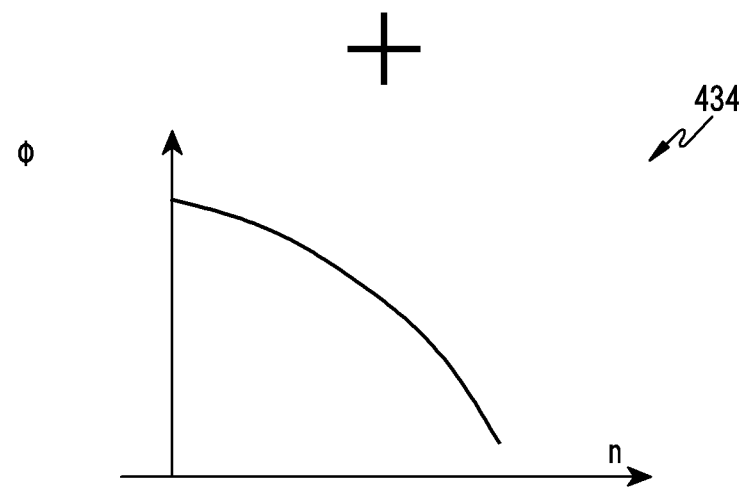
Figure 4C:
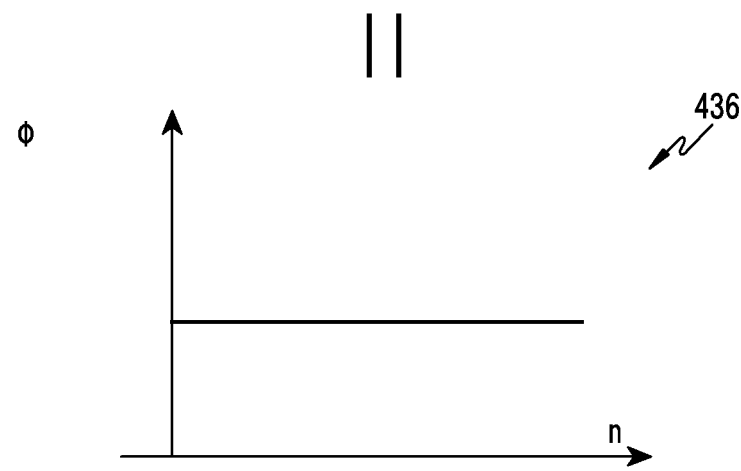

FIGS. 4A, 4B, and 4C illustrate the improvement of a signal gain through a lens in a wireless communication system according to various embodiments of the disclosure.

Referring to FIG. 4A, a signal radiated from the antenna array 220 passes through the lens 230. A beam 404 having passed through the lens 230 may have a narrower beam width than a beam 402 radiated from the antenna array 220. As beam components for forming the beam 404 overlap more in a specific space, a phase increases. The improvement of signal gain by the lens 230 is achieved by shifting the same phase from the surface of a sphere to a plane. That is, the phase of each of components of the radiated signal may be shifted to the same phase in the plane of the lens 230. Specifically, since the beam generated by the antenna array 220 is radiated from the center of the antenna, that is, the focus of the beam, a phase front is formed on the surface of a sphere centered at the focus. At this time, the lens 230 converts the phase front into a plane by using unit cells.

Referring to FIG. 4B, when the radius of the lens 230 and the distance between the lens 230 and the antenna array 220 are given, the maximum phase difference of a signal, observed on the surface of the lens 230, is as shown in Equation 1 below.

$$\phi_{max} = \frac{2\pi}{\lambda}\left[\sqrt{1+\left(\frac{D}{2F}\right)^2} - 1\right] \quad \text{Equation 1}$$

$\Phi_{max}$ is the maximum phase difference, $\lambda$ is a wavelength, D is the radius of a lens, and F is the distance between the lens and an antenna array.

A phase profile change of a beam radiated from the antenna array 220 is as shown in FIG. 4C. Referring to FIG. 4C, a graph 432 shows a phase profile in a plane (e.g., the surface of the lens 230 or a plane parallel to the surface of the lens 230) of a beam radiated from the antenna array 220, and a graph 434 shows a phase profile of lens 230, and graph 436 shows an in-phase profile of a beam having passed through the lens 230. As shown in graph 432, as the distance n from the center of the plane increases, the phase difference with the center increases. Accordingly, in order to compensate for the phase profile of graph 432, as shown in graph 434, the lens 230 is designed such that the phase difference with the center decreases as the distance from the center increases. Accordingly, as shown in the graph 436, the phase profile of the beam having passed through the lens 230 is in-phase or substantially in-phase in the plane.

Figure 5:
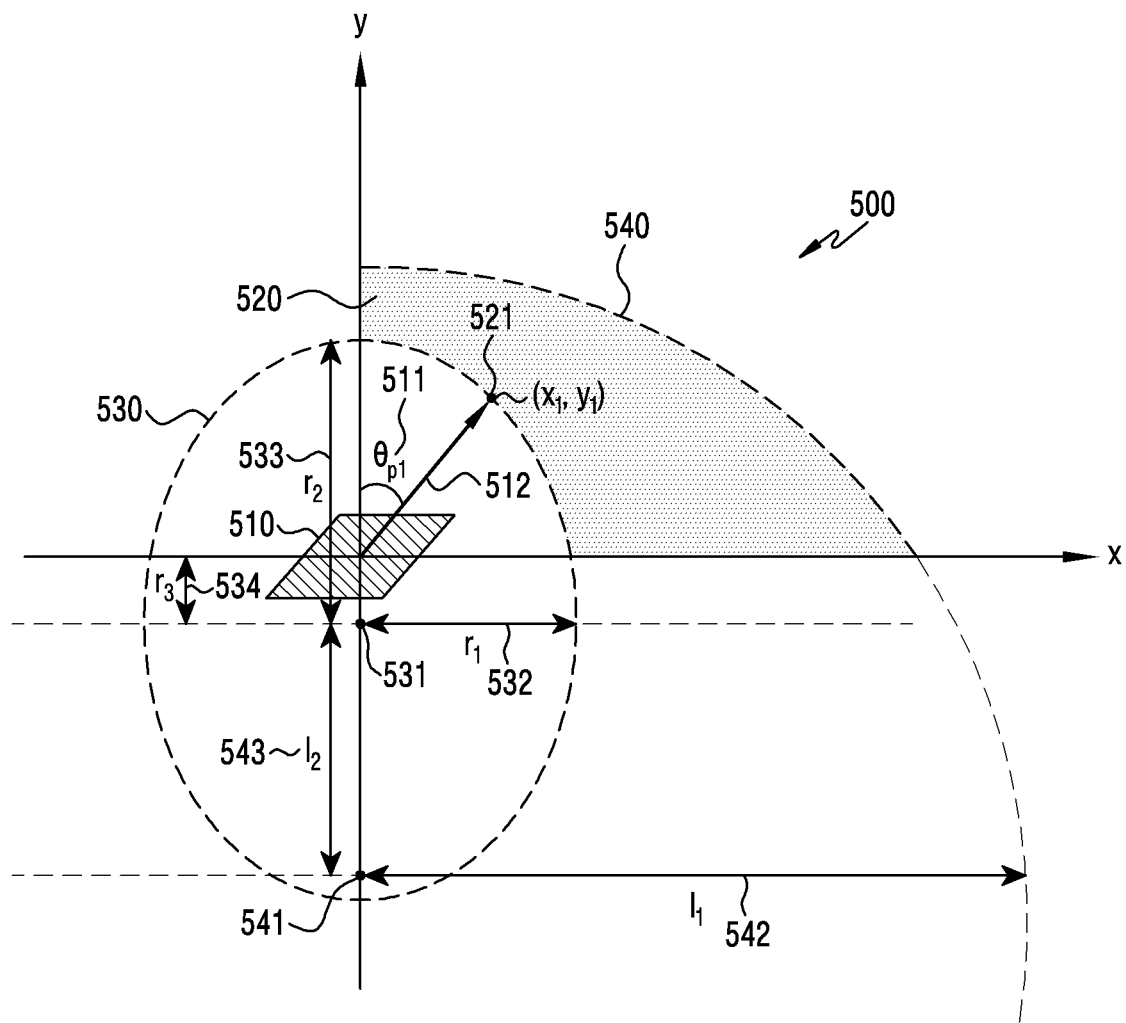
FIG. 5 illustrates an example in which a radiation signal of an electronic device is incident onto the inner surface of a lens according to an embodiment of the disclosure.

FIG. 5 illustrates an example in which a radiation signal of an electronic device is incident onto the inner surface of a lens according to an embodiment of the disclosure.

Referring to FIG. 5, each variable for analysis of an incident path is defined through a cross section of the lens. Hereinafter, in FIG. 5, a structure of a lens having an ellipsoidal inner surface and a spherical outer surface is illustrated in order to define each variable, but the disclosure is not limited thereto. For example, the lens may have an ellipsoidal inner surface and an ellipsoidal outer surface. In another example, the lens may have a spherical inner surface and a spherical outer surface. In another example, the lens may have a spherical inner surface and an ellipsoidal outer surface. In another example, the inner and outer surfaces of the lens may be configured to include some of the above-described tridimensional structures.

Referring to FIG. 5, an electronic device 500 may include an antenna 510 and a lens 520. The description of the beamforming device in FIG. 2 may also be applied to the electronic device 500. For example, the antenna 510 may be understood to be identical to the antenna array 220 in FIG. 2, and the lens 520 may be understood to be identical to the lens 230 in FIG. 2. Also, for convenience of description, FIG. 5 illustrates the electronic device 500 based on the xy-plane viewed from the z-axis.

The antenna 510 may be disposed at the origin, which is the point of contact between the x-axis and the y-axis. For example, the center of the antenna 510 may be located at the origin. Also, according to an embodiment, the antenna 510 may be a phased array antenna. The phased array antenna may include antenna elements arranged in a specific array. Beamforming technology using the phased array antenna is a high-gain antenna technology capable of beam steering by changing the phase of each of the antenna elements through electrical control. According to an embodiment, the center of the phased array antenna may coincide with the center of the lens 520. According to an embodiment, the phased array antenna may include antenna elements arranged in various shapes. For example, the phased array antenna may be configured to be linear. In another example, the phased array antenna may be configured in a planar shape. In another example, the phased array antenna may be configured in a tridimensional structure.

According to an embodiment, a radiation angle 511 of a beam radiated from the antenna 510 may be adjusted through beam steering. The phased array antenna may form multiple beams. Each of the beams may include a main lobe and a side lobe, and the radiation angle 511 may be determined based on the direction of a beam which has the highest beam gain by synthesizing main and secondary lobes of the multiple beams. In FIG. 5, the radiation angle 511 may be an interior angle up to a first beam 512 from the y-axis, which is the central axis of the antenna 510.

The center of the lens 520 may be located on a straight line together with the center of the antenna 510. For example, referring to FIG. 5, the lens 520 may exist in a bilaterally symmetrical structure with respect to the y-axis, and in this case, the center of the lens 520 may be a point where the y-axis and the lens 520 meet. Therefore, the center of the lens 520 and the center of the antenna 510 may be located on a straight line.

The lens 520 may include a dielectric having at least one layer. According to an embodiment, the lens 520 may include a single dielectric having a single layer. When the lens 520 includes a single dielectric, dielectric loss that may be caused by the non-uniformity of a material may be reduced, and thus the gain of a beam passing the lens 520 may be preserved compared to the lens 520 including multiple dielectrics. In addition, the lens 520 including a single dielectric may be easily produced compared to the lens 520 using multiple dielectrics, and the space occupied by the lens 520 may be reduced. According to another embodiment, the lens 520 may include multiple dielectrics having multiple layers. In this case, according to an additional embodiment, the multiple dielectrics having multiple layers may have different refractive indices.

Referring to FIG. 5, the lens 520 may include a first surface 530 and a second surface 540. In the lens 520 disposed on a radiation path of the antenna 510, the first surface 530 is disposed in a first direction toward the antenna 510, and may correspond to an inner surface of the lens 520. The second surface 540 is disposed in a second direction opposite to the first direction and may correspond to an outer surface of the lens 520. According to an embodiment, each of the first surface 530 and the second surface 540 may correspond to one surface of a three-dimensional figure. For example, the first surface 530 may correspond to one surface of an ellipsoid, and the second surface 540 may correspond to one surface of a sphere. Hereinafter, for convenience of description, it is assumed that the first surface 530 is one surface of an ellipsoid and the second surface 540 is one surface of a sphere, but the disclosure is not limited thereto.

As shown in FIG. 5, when there is a distance 534 (hereinafter referred to as a first distance) from the origin corresponding to the center of the antenna 510 to a center 531 of the first surface 530, an equation regarding the first surface 530 is as shown in Equation 2 below.

$$\frac{x^2}{r_1^2} + \frac{(y+r_3)^2}{r_2^2} = 1 \quad \text{Equation 2}$$

In Equation 2, $r_1$ denotes a first radius 532 having the minimum length among radii of the first surface 530, and $r_2$ denotes a second radius 533 having the maximum length among the radii of the first surface 530, and the $r_3$ denotes the first distance 534.

Referring to FIG. 5, the first surface 530 is one surface of an ellipsoid, and $r_1$ and $r_2$ may correspond to the minor axis and major axis of the first surface 530, respectively. Also, $r_3$ may denote the distance between the center of the first surface 530 and the antenna 510.

In addition, when there is a distance 543 (hereinafter referred to as a second distance) from the center 531 of the first surface 530 to a center 541 of the second surface 540, an equation regarding the second surface 540 is as shown in Equation 3 below.

$$x^2+(y+(r_3+l_2))^2=l_1^2 \quad \text{Equation 3}$$

$R_3$ denotes the first distance 534, $l_1$ denotes a third radius 542 of the second surface 540, and $l_2$ denotes the second distance 543 from the center 531 of the first surface 530 to the center 541 of the second surface 540.

According to an embodiment, when the coordinates of a first point 521 are (x1, y1), an expression regarding the correlation between the x-coordinate and the y-coordinate of the first point 521 is as shown in Equation 4 below.

$$y_1 = \cot \theta_{p1} x_1 \quad \text{Equation 4}$$

$x_1$ denotes an x-coordinate value of the first point 521, $y_1$ denotes a y-coordinate value of the first point 521, and $\theta_{p1}$ denotes the radiation angle 511 which is the angle between the first beam 512 and the y-axis.

When Equation 2, to which the value of Equation 4 has been applied, is rewritten, Equation 5 below is obtained.

$$\frac{x_1^2}{r_1^2} + \frac{(\cot\theta_{p1} x_1 + r_3)^2}{r_2^2} = 1 \quad \text{Equation 5}$$

$$\left(\frac{1}{r_1^2} + \frac{\cot^2\theta_{p1} x_1^2}{r_2^2}\right)x_1^2 + 2\frac{r_3 \cot\theta_{p1}}{r_2^2} + \frac{r_3^2}{r_2^2} - 1 = 0$$

$x_1$ denote the x-coordinate value of the first point 521, $y_1$ denotes the y-coordinate value of the first point 521, $\theta_{p1}$ denotes the radiation angle 511 which is the angle between the first beam 512 and the y-axis, $r_1$ denotes the first radius 532 having the minimum length among the radii of the first surface 530, $r_2$ denotes the second radius 533 having the maximum length among the radii of the first surface 530, and $r_3$ denotes the first distance 534.

According to an embodiment, the lens 520 includes the first surface 530 and the second surface 540, which correspond to one surface of an ellipsoid and one surface of a sphere, respectively. In addition, the antenna 510 may be disposed in an inner space formed by the first surface 530 of the lens 520, and the center of the antenna 510 may be located on the y-axis where the center of the lens 520 exists. Equation 4 shows the correlation at the first point 521 existing on the first surface 530 of the lens 520, but this may imply a path of the first beam 512 before the first beam 512 radiated from the antenna 510 is incident on the first surface 530.

Figure 6:
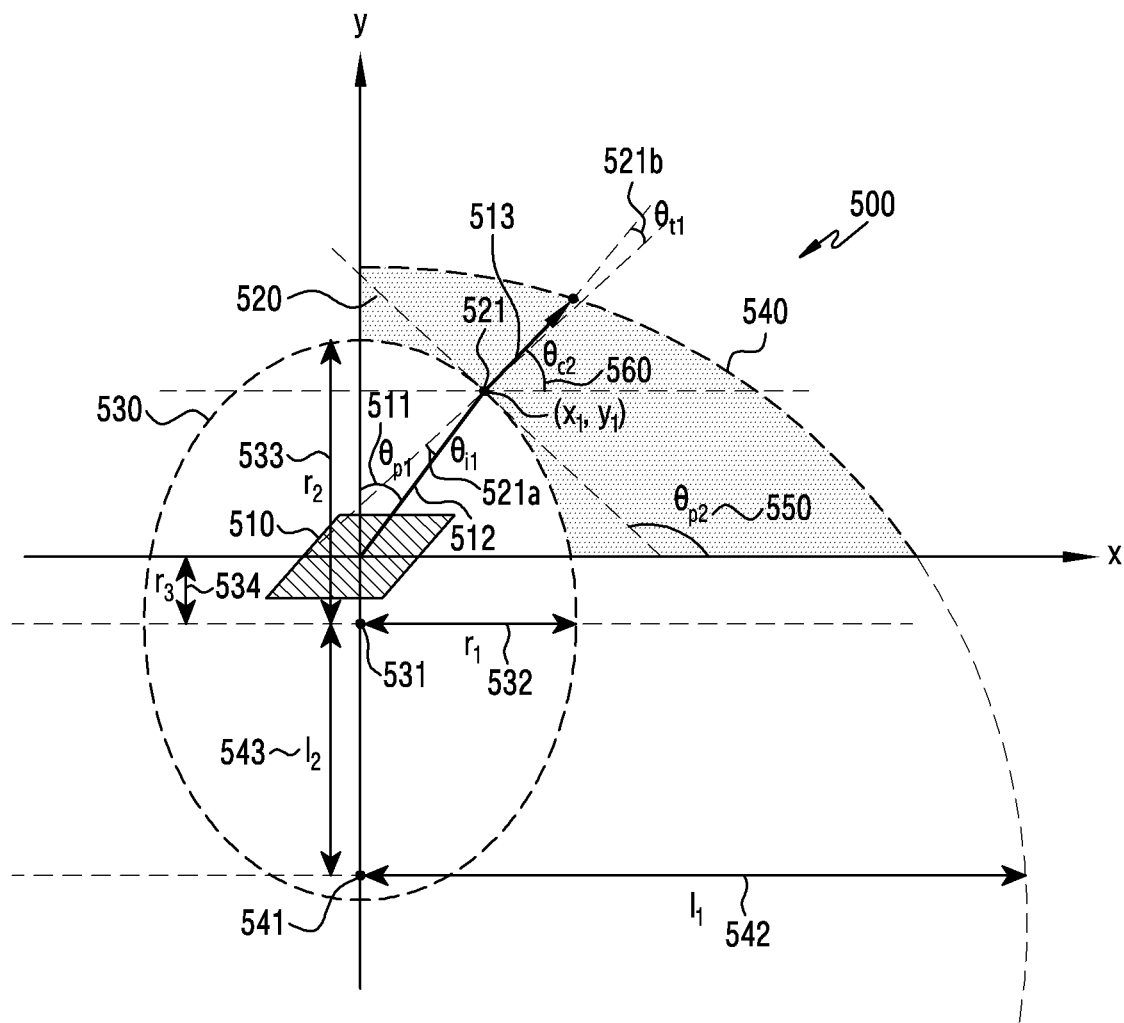
FIG. 6 illustrates an example in which a radiation signal of an electronic device is refracted on the inner surface of a lens according to an embodiment of the disclosure.

FIG. 6 illustrates an example in which a radiation signal of an electronic device is refracted on the inner surface of a lens according to an embodiment of the disclosure.

Referring to FIG. 6, each variable for analyzing an incident path is defined through a cross section of the lens. Hereinafter, in FIG. 6, a structure of a lens having an ellipsoidal inner surface and a spherical outer surface is illustrated in order to define each variable, but the disclosure is not limited thereto. For example, the lens may have an ellipsoidal inner surface and an ellipsoidal outer surface. In another example, the lens may have a spherical inner surface and a spherical outer surface. In another example, the lens may have a spherical inner surface and an ellipsoidal outer surface. In another example, the inner and outer surfaces of the lens may be configured to include some of the above-described tridimensional structures.

Referring to FIG. 6, the first beam 512 radiated from the antenna 510 may pass through the first point 521 of the first surface 530 and enter the lens 520. The first beam 512 may be refracted by a dielectric of the lens 520, having at least one layer, and may have directivity of a first path 513. According to the direction of the first path 513, an incident angle 521a at the first point 521 and a refraction angle 521b at the first point 521 are defined. Hereinafter, when the refracted first path 513 enters the inside of the lens 520, the path inside the lens 520 will be described by Equation 6 to Equation 11 below.

When Equation 2, which is an equation regarding the first surface 530, is differentiated with respect to x and rearranged, the following Equation 6 is obtained.

$$\frac{2x}{r_1^2} + \frac{2(y+r_3)}{r_2^2}\frac{dy}{dx} = 0 \quad \text{Equation 6}$$

$$\frac{dy}{dx} = -\frac{x}{y+r_3}\left(\frac{r_2}{r_1}\right)^2$$

$r_1$ denotes the first radius 532 having the minimum length among the radii of the first surface 530, $r_2$ denotes the second radius 533 having the maximum length among the radii of the first surface 530, $r_3$ denotes the first distance 534, and dy/dx denotes the differentiation of y with respect to x.

Also, referring to FIG. 6, when it is assumed that an obtuse angle formed by a tangent at the first point 521 and the x-axis is a first angle 550, the relationship between the first angle 550 and Equation 6 described above is as shown in Equation 7.

$$\left(\frac{dy}{dx}\right)_{(x_1,y_1)} = -\frac{x_1}{y_1+r_3}\left(\frac{r_2}{r_1}\right)^2 = \tan\theta_{p2} \quad \text{Equation 7}$$

$r_1$ denotes the first radius 532 having the minimum length among the radii of the first surface 530, $r_2$ denotes the second radius 533 having the maximum length among the radii of the first surface 530, $r_3$ denotes the first distance 534, dy/dx denotes the differentiation of y with respect to x, and $\theta_{p2}$ denotes the first angle 550.

Referring to Equation 7 described above, when a value of the first angle 550 is specified through the first radius 532 and the second radius 533 of the first surface 530 and the coordinates at the first point 521, the incident angle 521a at the first point 521 may be specified through Equation 8 below.

$$\theta_{i1} = \pi - \theta_{p1} - \theta_{p2} \qquad \text{Equation 8}$$

$\theta_{p1}$ denotes the radiation angle 511 which is an angle between the first beam 512 and the y-axis, $\theta_{p2}$ denotes the first angle 550, and $\theta_{i1}$ denotes the incident angle 521a at the first point 521.

In addition, the refraction angle 521b at the first point 521 is determined by the incident angle 521a at the first point 521 and the refractive index of the lens 520, as shown in Equation 9 below.

$$\theta_{r1} = \sin^{-1}\left(\frac{\sin\theta_{i1}}{n_t}\right) \qquad \text{Equation 9}$$

$\theta_{r1}$ denotes the refraction angle 521b at the first point 521, $\theta_1$ denotes the incident angle 521a at the first point 521, $n_t$ denotes the refractive index of the lens 520, and Equation 9 follows Snell's law.

When an acute angle formed by a straight line parallel to the x-axis and the refracted first path 513 at the first point 521 is a second angle 560, the refracted first path 513 inside the lens 520 may be specified by the second angle 560. The second angle 560 may be determined by Equation 10 below.

$$\theta_{c2} = \theta_{r1} + \theta_{p2} - \frac{\pi}{2} \qquad \text{Equation 10}$$

$\theta_{c2}$ denotes the second angle 560, $\theta_{r1}$ denotes the refraction angle 521b at the first point 521, $\theta_{p2}$ denotes the first angle 550, and $\pi/2$ denotes the radio of the circumference of a circle to its diameter. The unit of the circumference ratio corresponds to radian.

Considering the second angle 560 specified by Equation 10 described above, the path of the refracted first path 513, passing through the first point 521, inside the lens 520 is as shown in Equation 11 below.

$$y = \tan\theta_{c2}(x - x_1) + y_1 \qquad \text{Equation 11}$$

$\theta_{c2}$ denotes the second angle 560, $x_1$ denotes the x-coordinate value of the first point 521, and $y_1$ denotes the y-coordinate value of the first point 521.

As described above, the first beam 512 is refracted while being incident on the first surface 530 of the lens 520, and thus the refracted first path 513 is formed. The path of the refracted first path 513 disclosed in Equation 11 may be changed depending on the radiation angle 511 of the first beam 512, and the structure (e.g., radius, curvature, etc.) and refractive index of the first surface 530 and the second surface 540 of the lens 520.

In FIG. 6, the lens is illustrated as having one refractive index assuming a single layer, but the disclosure is not limited thereto. According to an embodiment, the lens 520 may include multiple layers instead of a single layer. At this time, the permittivity of at least two layers may be configured differently. Therefore, using the equation described above makes it possible to design a lens through refraction of a beam direction between different layers.

Figure 7:
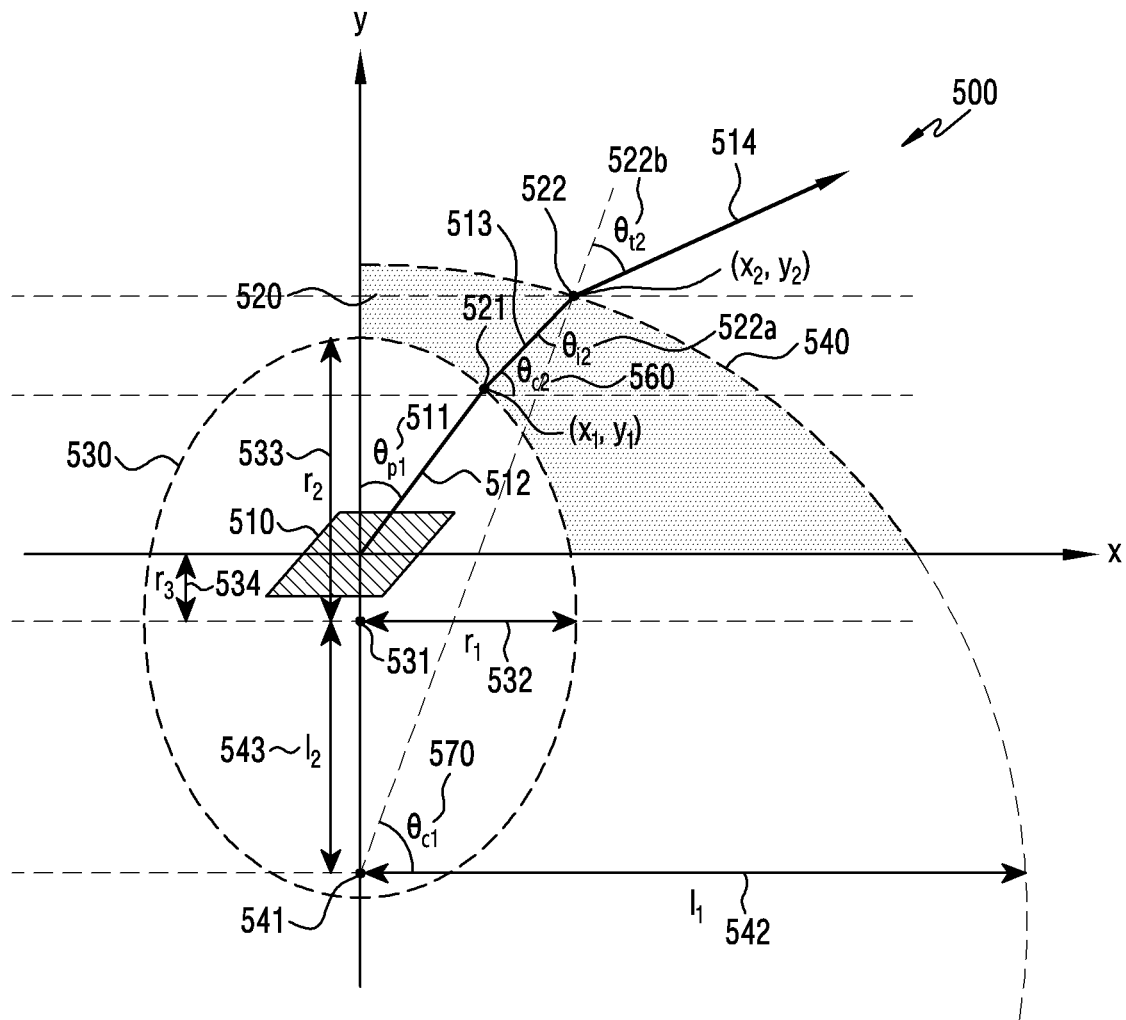
FIG. 7 illustrates an example in which a radiation signal of an electronic device is refracted on the outer surface of a lens according to an embodiment of the disclosure.

FIG. 7 illustrates an example in which a radiation signal of an electronic device is refracted on the outer surface of a lens according to an embodiment of the disclosure.

Referring to FIG. 7, each variable for analyzing the incident path is defined through the cross section of the lens. Hereinafter, in FIG. 7, a structure of a lens having an ellipsoidal inner surface and a spherical outer surface is illustrated in order to define each variable, but the disclosure is not limited thereto. For example, the lens may have an ellipsoidal inner surface and an ellipsoidal outer surface. In another example, the lens may have a spherical inner surface and a spherical outer surface. In another example, the lens may have a spherical inner surface and an ellipsoidal outer surface. In another example, the inner and outer surfaces of the lens may be configured to include some of the above-described tridimensional structures.

Referring to FIG. 7, a signal radiated from the antenna 510 of the electronic device may pass through the inside of the lens 520 and may be refracted when radiated out of the lens 520. For example, as a refracted beam of the first path 513 passes through a second point 522 of the second surface 540 and is radiated out of the lens 520, the beam refracted by the dielectric of the lens 520, having at least one layer, may be refracted again. The beam may be radiated to a second path 514 by passing through the first surface 530 and the second surface 540. Also, depending on the second path 514, an incident angle 522a at the second point 522 and a refraction angle 522b at the second point 522 may be defined. Hereinafter, the second path 514 and the curvatures of the first surface 530 and the second surface 540 will be described by Equation 12 to Equation 16.

A third angle 570 is an acute angle formed by a straight line from a center 541 of the second surface 540 of the lens 520 to the second point 522 and a straight line parallel to the x-axis at the center 541 of the second surface 540. The incident angle 522a at the second point 522 determined by the third angle 570 and the second angle 560 is as shown in Equation 12 below.

$$\theta_{i2} = \theta_{c1} - \theta_{c2} \qquad \text{Equation 12}$$

$\theta_{i2}$ denotes the incident angle 522a at the second point 522, $\theta_{c2}$ denotes the second angle 560, and $\theta_{c1}$ denotes the third angle 570.

Also, the refraction angle 522b at the second point 522 is determined by the incident angle 522a at the second point 522 and the refractive index of the lens 520, as shown in Equation 13 below.

$$\theta_{r2} = \sin^{-1}(n_t \sin\theta_{i2}) \qquad \text{Equation 13}$$

$\theta_{r2}$ denotes the refraction angle 522b at the second point 522, $n_t$ denotes the refractive index of the lens 520, and Equation 13 follows Snell's law. In this case, the refraction angle 522b at the second point 522 may be greater than or equal to the radiation angle 511 of the first beam 512 radiated from the antenna 510. For example, when the radiation angle 511 is 0°, the refraction angle 522b is equal to 0°, and when the radiation angle 511 is greater than 0°, the refraction angle 522b is greater than the radiation angle 511.

Referring to FIG. 7, when the second path 514 of the first beam 512 is radiated out of the lens 520, the path thereof is specified by an acute angle, formed by the second path 514 of the first beam 512 and the straight line parallel to the x-axis at the second point 522, and coordinates at the second point 522. The second path 514 of the first beam 512 is as shown in Equation 14 below.

$$y = \tan(\theta_{c1} - \theta_{r2})(x - x_2) + y_2 \qquad \text{Equation 14}$$

$\theta_{c1}$ denotes the third angle 570, $\theta_{r2}$ denotes the refraction angle 522b at the second point 522, $x_2$ denotes the x-coordinate value of the second point 522, and $y_2$ denotes the y-coordinate value of the second point 522.

The second path 514 disclosed in Equation 14 described above refers to a path along which the first beam 512 radiated from the antenna 510 is radiated out of the lens 520.

In relation to the second path 514 of the first beam 512 described above, total reflection may occur when the refraction angle 522b becomes excessively large. According to Snell's law, when the incident angle 522a exceeds a critical angle, the second path 514 may be formed along the second surface 540 of the lens 520.

In FIGS. 5 to 7, a process in which a beam radiated from the antenna 510 passes through the lens 520 and is refracted while the beam is radiated out of the lens 520 has been described. Summarizing the descriptions of FIGS. 5 to 7, a path through which a beam is radiated out of the lens 520, that is, the second path 514, may be determined by the following factors.

According to an embodiment, the first angle 550 and the incident angle 521a and the refraction angle 521b at the first point 521 may be adjusted by adjusting the radiation angle 511 of the antenna 510 and the refractive index inside the lens 520. According to an embodiment, the incident angle 522a and the refraction angle 522b at the second point 522 may be adjusted by adjusting the radiation angle 511 of the antenna 510 and the refractive index inside the lens 520.

According to an embodiment, as the curvatures of the first surface 530 and the second surface 540 of the lens 520 are adjusted, a refraction angle of a beam radiated out of the lens 520 (e.g., the refraction angle 522b at the second point 522)) may be adjusted. Although not illustrated in the drawing, the structure of the lens 520 may be specified by the curvatures of the first surface 530 and the second surface 540 of the lens 520. The curvature of the first surface 530 of the lens 520 for specifying the structure of the lens 520 may be determined by Equation 15 below, and the curvature of the second surface 540 of the lens 520 for specifying the structure of the lens 520 may be determined by Equation 16 below.

$$\frac{r_1 r_2}{(r_1^2 \sin\theta_{p1}^2 + r_2^2 \cos\theta_{p1}^2)^{3/2}}$$ Equation 15

$r_1$ denotes the first radius 532 of the first surface 530, $r_2$ denotes the second radius 533 of the first surface 530, and $\theta_{p1}$ denotes the radiation angle 511 of the first beam 512 radiated from the antenna 510.

$$\frac{1}{l_1}$$ Equation 16

$l_1$ denotes the third radius 542 of the second surface 540.

As described in Equation 15, the curvature of the first surface 530 of the lens 520 may be determined by the first radius 532, the second radius 533, and the radiation angle 511. At this time, the slope at the first point 521 varies depending on the curvature of the first surface 530. Referring to Equation 7, the curvature of the first surface 530 may affect the first angle 550. Referring to Equation 8, as the first angle 550 is adjusted, the incident angle 521a at the first point 521 may be adjusted. Also, as described in Equation 16, the curvature of the second surface 540 of the lens 520 may be determined by the third radius 542. At this time, the curvature of the second surface 540 is determined by the third radius 542. The position of the point at which a beam traveling along the refracted first path 513 is incident on the second surface 540, that is, the second point 522, is changed depending on the third radius 542 of the second surface 540. Thus, the curvature of the second surface 540 may affect the third angle 570 and the incident angle 522a at the second point 522. Accordingly, as the curvatures of the first surface 530 and the second surface 540 of the lens 520 are adjusted, the refraction angle of the beam radiated out of the lens 520 may be adjusted.

That is, at the time of designing the lens 520, the above-described principle may be applied in designing the curvature of each surface. For example, if it is necessary to maintain the curvature at a specific point of the first surface 530 while increasing the first radius 532 of the first surface 530, a lens having a different structure while maintaining the curvature at the specific point of the first surface 530 may be produced by adjusting the second radius 533 of the first surface 530 and the radiation angle 511 of the first beam 512. In addition, a point at which the beam having passed through the first surface 530 is incident on the second surface 540 varies depending on the thickness of the lens 520. For example, assuming that the existing first path 513 is maintained, when the thickness of the lens 520 is reduced, that is, when the third radius 542 of the second surface 540 is shortened, the second point 522 may be formed closer to the first point 521 than before. Accordingly, the third angle 570, and the incident angle 522a and the refraction angle 522b at the second point 522 may be changed. For example, when the thickness of the lens 520 is designed to be thin, the second path 514 of the lens 520 may change, and thus, in consideration thereof, the refractive index of the dielectric of the lens 520, etc. may be adjusted, thereby designing a lens forming the same refraction angle 522b as before.

Hereinafter, a description will be made of the gain of a beam radiated out of the lens 520 according to the radiation angle of the beam radiated from the antenna 510 in the electronic device including the antenna 510 and the lens 520.

Figure 8:
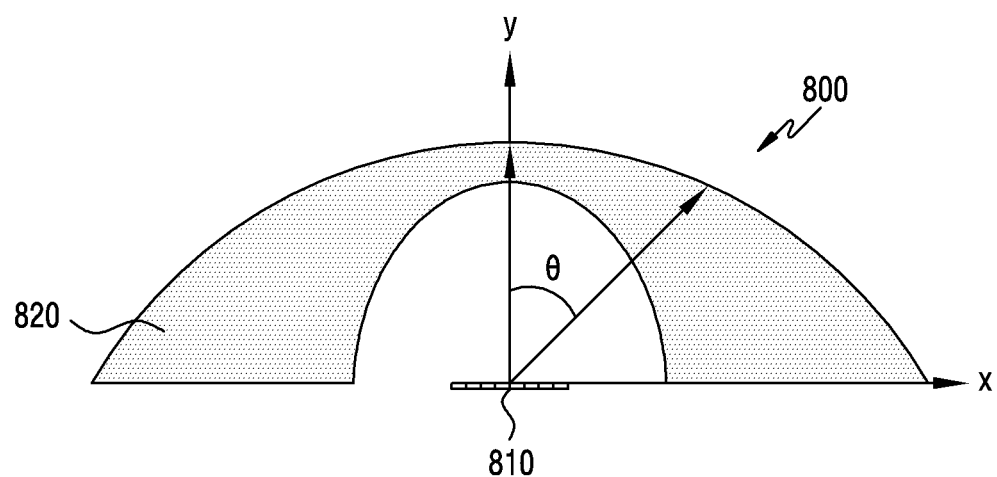
FIG. 8 illustrates an example of an antenna and a lens of an electronic device according to an embodiment of the disclosure.
Figure 9:
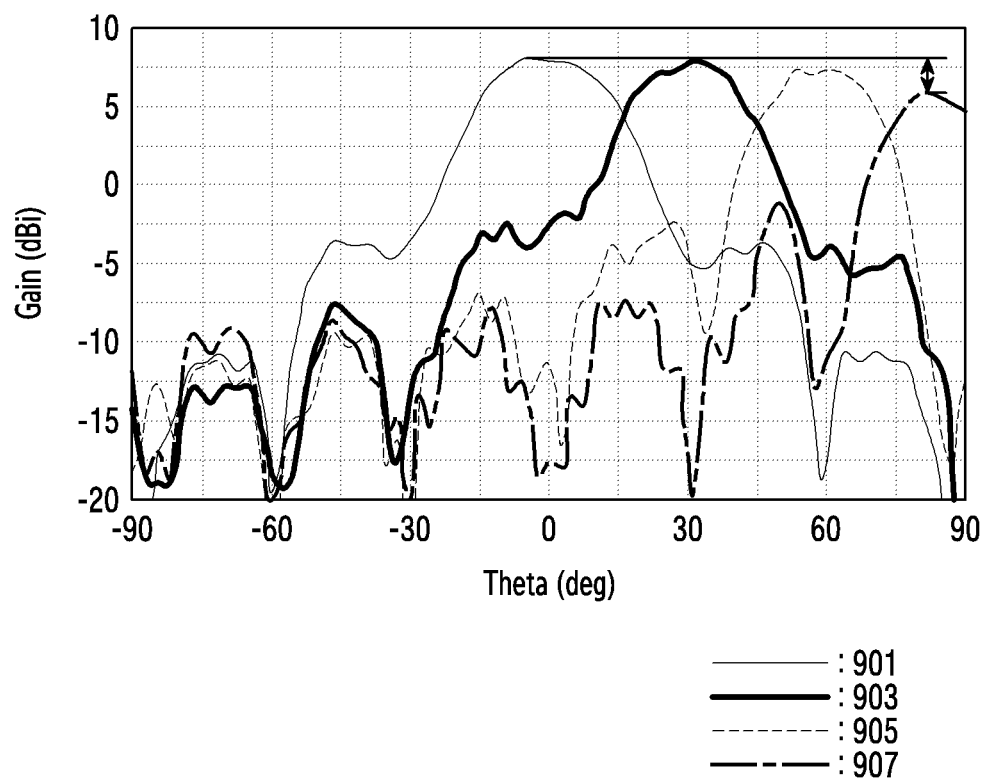
FIG. 9 is a graph illustrating performance based on lens arrangement according to an embodiment of the disclosure.

FIG. 8 illustrates an example of an antenna and a lens of an electronic device according to an embodiment of the disclosure. FIG. 9 is a graph illustrating performance based on lens arrangement according to an embodiment of the disclosure.

Referring to FIG. 8, an electronic device 800 may include an antenna 810 and a lens 820. The center of the antenna 810 may be located at a point at which the x-axis and the y-axis meet, that is, the origin. In addition, the lens 820 including an inner surface disposed adjacent to the antenna 810 and an outer surface disposed in the opposite direction to the inner surface may be disposed on the radiation path of the antenna 810. Angle θ may be an angle formed by a beam radiated from the antenna 810 and the y-axis. In this case, when the beam radiated from the antenna 810 includes a main lobe and a side lobe, angle θ may be an angle formed between the main lobe and the y-axis.

In addition, FIG. 8 shows the electronic device 800 when a tridimensional figure formed by rotating the electronic device 500 shown in FIGS. 5 to 7 by 360° about the y-axis is cut with reference to the xy plane and viewed from the z-axis. The description of the electronic device 500 in FIGS. 5 to 7 may be identically applied to the electronic device 800 in FIG. 8. For example, the lens 820 may be understood to be identical to the lens 520 in FIGS. 5 to 7.

FIG. 9 illustrates the gain of a beam, radiated from the antenna 810, at a point away from by at θ° from the y-axis when the radiated beam passes through the lens 820 including a single dielectric (e.g., permittivity=3.7, dielectric loss=0.02) and is refracted while being radiated to the outside. The beam radiated from the antenna 810 may include a main lobe and a side lobe, and the gain of the beam may be determined by synthesizing the main lobe and the side lobe. Accordingly, FIG. 9 illustrates a gain of a beam formed while changing a radiation angle (e.g., θ in FIG. 8), which is an angle formed between the main lobe and the y-axis.

Referring to FIG. 9, a first graph 901 shows a beam gain at θ° with respect to the y-axis when the radiation angle of the main lobe of the beam radiated from the antenna 810 is 0°. A second graph 903 shows a beam gain at θ° with respect to the y-axis when the radiation angle of the main lobe of the beam radiated from the antenna 810 is 30°. A third graph 905 represents a beam gain at θ° with respect to the y-axis when the radiation angle of the main lobe of the beam radiated from the antenna 810 is 60°. A fourth graph 907 shows a beam gain at θ° with respect to the y-axis when the radiation angle of the main lobe of the beam radiated from the antenna 810 is 82°.

Referring to the first graph 901, it may be found that when the radiation angle of the main lobe of the beam radiated from the antenna 810 (hereinafter, the "radiation angle of the main lobe" is referred to as "radiation angle") is 0°, the gain of the beam refracted while passing through the lens 820 maximized to about 7.5 dBi at a point where θ° is about 0°. In addition, referring to the second graph 903, it may be found that when the radiation angle of the beam radiated from the antenna 810 is 30°, the gain of the beam refracted while passing through the lens 820 is maximized to about 7.5 dBi at a point where θ° is about 30°. In addition, referring to the third graph 905, it may be found that when the radiation angle of the beam radiated from the antenna 810 is 60°, the gain of the beam refracted while passing through the lens 820 is maximized to about 7.5 dBi at a point where θ° is about 60°. In addition, referring to the fourth graph 907, it may be found that when the radiation angle of the beam radiated from the antenna 810 is 82°, the gain of the beam refracted while passing through the lens 820 is maximized to about 6 dBi at a point where θ° is about 82°. Therefore, in the electronic device 800, even when the radiation angle of the beam radiated from the antenna 810 is about 60° or more, the gain of the beam having passed through the lens 820 may be formed as a targeted value (e.g., the difference between the maximum gain value according to the radiation angle and the beam gain value at 0°, where the beam gain is maximum, is within about 6 dBi) even at about 60° or more.

Referring to FIGS. 1, 2, 3A to 3C, 4A to 4C, and 5 to 9, the electronic device according to an embodiment of the disclosure may perform beam steering of a wide angle (e.g., a maximum steering angle of about 60° or more) by adjusting the curvature of the inner and outer surfaces of a lens, the refractive index of a dielectric included in the lens, and the radiation angle of a beam radiated from an antenna, as described above.

According to an embodiment, taking into account the curvature of the inner and outer surfaces of a lens and the limitations of the refractive index values of dielectrics in the lens, the electronic device may adjust the radiation angle of a beam radiated from an antenna to adjust the refraction angle of the beam radiated out of the lens. The electronic device may perform wide-angle beam steering by adjusting the refraction of a beam radiated out of the lens according to the above-described principle in FIGS. 5 to 7. A method of adjusting a radiation angle of a beam radiated from an antenna may vary depending on the type of antenna. For example, a phased array antenna may adjust the radiation angle by adjusting a phase by means of an electrical signal. In another example, an active lens may adjust a radiation angle by physically changing the radiation direction of a radiator. Accordingly, the electronic device including a lens according to an embodiment of the disclosure may be applied regardless of the type of antenna.

According to another embodiment, the principle of the disclosure may be applied to the design of a lens included in an electronic device. The lens may be designed by adjusting the curvatures of the inner and outer surfaces of the lens and the refractive indices of dielectrics in the lens in consideration of the limit of the radiation angle of a beam radiated from an antenna. Even when the radiation angle of a beam formed by the antenna is the same, the refraction angle of the beam radiated out of the lens may vary depending on which lens the beam formed by the antenna enters. The electronic device may perform wide-angle beam steering by adjusting, using a lens determined according to a required wide angle, a refraction angle of a beam radiated out of the lens.

In addition, when compared with the conventional integrated lens antenna (ILA) technology in which a lens is added to a phased array antenna, the electronic device according to an embodiment of the disclosure is practical because the electronic device may have a simple manufacturing process and may be applied to any antenna. In addition, the electronic device according to an embodiment of the disclosure may form a gain of a beam similar to that of non-wide-angle beam steering even during wide-angle beam steering. For example, in the case of using a lens including single or multiple dielectrics and having a tridimensional structure (e.g., spherical, extended hemispherical, elliptical, stepped profile, etc.) according to the conventional ILA technology, the maximum steering angle is about 60°, making wide-angle steering impossible. However, the electronic device according to an embodiment of the disclosure is capable of performing wide-angle steering with a maximum steering angle of about 60° or more and less than about 90° by using a lens composed of a single dielectric. In another example, an electronic device including a lens made of a metamaterial according to the conventional ILA technology enables wide-angle steering with a maximum steering angle of about 90°, but is only available in a narrow band, and is thus impractical. However, the electronic device according to an embodiment of the disclosure is capable of wide-angle steering, and is highly practical in that the electronic device can be used regardless of the frequency bandwidth of a beam passing through a lens, when considering the equations described above. In another example, the electronic according to an embodiment of the disclosure may be applied to any antenna (e.g., a linear phased array antenna, a planar phased array antenna, a tridimensionally-structured phased array antenna, etc.), and is thus highly practical.

According to an embodiment of the disclosure as described above, a beamforming device in a wireless communication system may include a phased array antenna, at least one wireless communication circuit, and a lens, wherein the lens includes a first surface facing a first direction, which is a direction toward the phased array antenna, and a second surface facing a second direction opposite to the first direction, a first beam radiated from the phased array antenna is refracted past a first point on the first surface, the first beam forms a first path in the lens and a second path along which the first beam passing through the inside of the lens along the first path and passing through a second point on the second surface is refracted, and a refraction angle at the second point is formed to depend on a radiation angle of the first beam.

In an embodiment, the first surface corresponds to one surface of an ellipsoid, and when a radius having the smallest length among radii of the ellipsoid is a first radius and a radius having the largest length is a second radius, the curvature of the first surface may be changed by changing the first radius, the second radius, and the radiation angle of the first beam.

In an embodiment, the second surface corresponds to one surface of a sphere, and when the radius of the sphere is a third radius, the curvature of the second surface may be changed by changing the third radius.

In an embodiment, the center of the phased array antenna and the center of the lens may be arranged on a straight line.

In an embodiment, the lens may include a single dielectric having a single layer.

In an embodiment, the lens may include multiple dielectrics having multiple layers.

In an embodiment, the multiple dielectrics having the multiple layers may have different refractive indices.

In an embodiment, an incident angle at the first point may be changed by changing the radiation angle of the first beam and the curvature of the first surface.

In an embodiment, a refraction angle at the first point may be changed by changing the refractive index of at least one dielectric of the lens and the incident angle at the first point.

In an embodiment, an incident angle at the second point may be changed by changing the refraction angle at the first point and the curvature of the second surface.

In an embodiment, the refraction angle at the second point may be changed by changing the refractive index of at least one dielectric of the lens and the incident angle at the second point.

In an embodiment, the refraction angle at the second point may have a greater value than a radiation angle at the first point.

In an embodiment, the angle of refraction at the second point may be greater than or equal to 60° and less than 90°.

In an embodiment, the phased array antenna may be arranged in a linear array.

In an embodiment, the phased array antenna may be arranged in a planar array.

In an embodiment, the phased array antenna may have a tridimensional structure.

In an embodiment, a first radiation angle value of the radiation angle according to a first refraction angle value of the refraction angle at the second point is different from a second radiation angle value of the radiation angle according to a second refraction angle value of the refraction angle at the second point, and the first refraction angle value may be different from the second refraction angle value.

In an embodiment, the lens is a first lens, and the beamforming device may further include a second lens spaced apart from the first lens and disposed on the second path of the beam.

In an embodiment, the lens may be configured such that the second path is not parallel to a radiation path of the first beam.

In an embodiment, the beamforming device may further include a communication unit configured to adjust a phase pattern of the phased array antenna.

The methods according to the claims of this disclosure or the embodiments described herein may be implemented in the form of hardware, software, or a combination of hardware and software.

When implemented as software, a computer-readable storage medium storing one or more programs (software modules) may be provided. The one or more programs stored on the computer-readable storage medium are configured for execution by one or more processors in the electronic device. The one or more programs include instructions that cause the electronic device to execute methods according to the claims or embodiments described herein.

Such programs (software modules, software) may be stored in random access memory, non-volatile memory including flash memory, read only memory (ROM), electrically erasable programmable read only memory (EEPROM), magnetic disk, or other non-volatile memory, (EEPROM), magnetic disc storage device, compact disc-ROM (CD-ROM), digital versatile discs (DVDs) or other forms of optical storage, magnetic cassette. Alternatively, it may be stored in a memory comprising a combination of any or all of these. Further, there may be multiple of each of these configuration memories.

Further, the program may be stored on an attachable storage device that is accessible via a communication network, such as the Internet, an intranet, a local area network (LAN), a wide area network (WAN), or a storage area network (SAN), or a combination thereof. Such a storage device may be accessible via an external port to a device practicing an embodiment of the disclosure. Additionally, a separate storage device on a communications network may be accessible to the device performing the embodiments of the disclosure.

In the specific embodiments of the disclosure described above, the components included in the disclosure are expressed in the singular or plural, depending on the specific embodiment presented. However, the singular or plural expression is chosen for ease of description and to suit the context presented, and the disclosure is not limited to the singular or plural components, and components expressed in the plural may be comprised in the singular, or components expressed in the singular may be comprised in the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A beamforming device in a wireless communication system, the beamforming device comprising:
   a phased array antenna;
   at least one wireless communication circuit; and
   a lens,
   wherein the lens comprises:
      a first surface facing a first direction, which is a direction toward the phased array antenna, and
      a second surface facing a second direction opposite to the first direction,
   wherein a first beam radiated from the phased array antenna is refracted past a first point on the first surface,
   wherein the first beam forms a first path in the lens and a second path along which the first beam passing through an inside of the lens along the first path and passing through a second point on the second surface is refracted,
   wherein a refraction angle at the second point is formed to depend on a radiation angle of the first beam,
   wherein the first surface corresponds to a portion of an ellipsoid, wherein the second surface corresponds to a portion of a sphere, wherein the major axis of the ellipsoid of the lens is located on the diameter of the sphere, wherein the phased array antenna is disposed parallel to the minor axis of the ellipsoid, wherein a center of the phased array antenna is located between a center of the ellipsoid and one focus of the ellipsoid, wherein the center of the phased array antenna is spaced apart from the center of the ellipsoid by a first distance and from a center of the sphere by a second distance greater than the first distance, wherein the one focus is located in a direction in which the first beam is directed among focuses of the ellipsoid, wherein the center of the ellipsoid is apart from the first surface by half of the major axis, wherein the center of the sphere is apart from the second surface by a radius of the sphere, and wherein the lens is symmetrical with respect to the major axis of the ellipsoid.

2. The beamforming device of claim 1, wherein, when a radius having a smallest length among radii of the ellipsoid is a first radius and a radius having a largest length is a second radius, a curvature of the first surface is changed by changing the first radius, the second radius, and the radiation angle of the first beam.

3. The beamforming device of claim 1, wherein, when a radius of the sphere is a third radius, a curvature of the second surface is changed by changing the third radius.

4. The beamforming device of claim 1, wherein the center of the phased array antenna and a center of the lens is arranged on a straight line.

5. The beamforming device of claim 1, wherein the lens comprises a single dielectric having a single layer.

6. The beamforming device of claim 1, wherein the lens comprises multiple dielectrics having multiple layers.

7. The beamforming device of claim 6, wherein the multiple dielectrics having the multiple layers have different refractive indices.

8. The beamforming device of claim 6, wherein an incident angle at the first point is changed by changing the radiation angle of the first beam and a curvature of the first surface.

9. The beamforming device of claim 8, wherein a refraction angle at the first point is changed by changing a refractive index of at least one dielectric of the lens and the incident angle at the first point.

10. The beamforming device of claim 9, wherein an incident angle at the second point is changed by changing the refraction angle at the first point and a curvature of the second surface.

11. The beamforming device of claim 10, wherein a refraction angle at the second point is changed by changing a refractive index of at least one dielectric of the lens and the incident angle at the second point.

12. The beamforming device of claim 1, wherein the refraction angle at the second point has a greater value than a radiation angle at the first point.

13. The beamforming device of claim 1, wherein the refraction angle at the second point is greater than 60° and less than 90°.

14. The beamforming device of claim 1, wherein the phased array antenna is arranged in a linear array.

15. The beamforming device of claim 1, wherein the phased array antenna is arranged in a planar array.

16. The beamforming device of claim 1, wherein the phased array antenna is configured to have a tridimensional structure.

17. The beamforming device of claim 1, further comprising:
adjusting the radiation angle of the first beam through beam steering,
wherein a first radiation angle value of the radiation angle of the first beam according to a first refraction angle value of the refraction angle at the second point is different from a second radiation angle value of the adjusted radiation angle of the first beam according to a second refraction angle value of the refraction angle at the second point, and
wherein the first refraction angle value is different from the second refraction angle value.

18. The beamforming device of claim 1, further comprising:
another lens spaced apart from the lens and disposed on the second path of the first beam.

19. The beamforming device of claim 1, wherein the lens is configured such that the second path is not parallel to a radiation path of the first beam.

20. The beamforming device of claim 1, further comprising:
a communication unit configured to adjust a phase pattern of the phased array antenna.

* * * * *